June 1, 1937.    A. LEWIS    2,082,068
THEFTPROOF PLUG
Filed Oct. 6, 1936
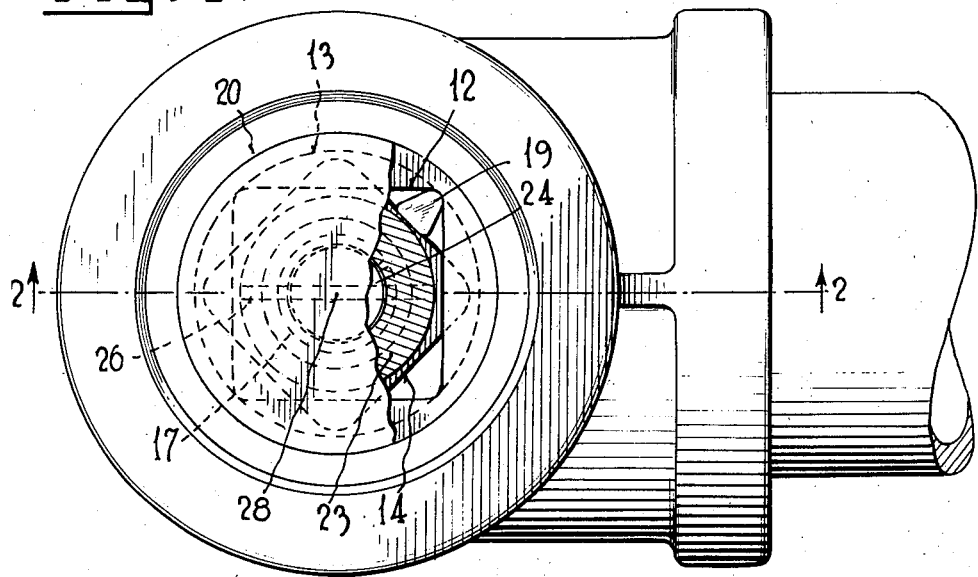
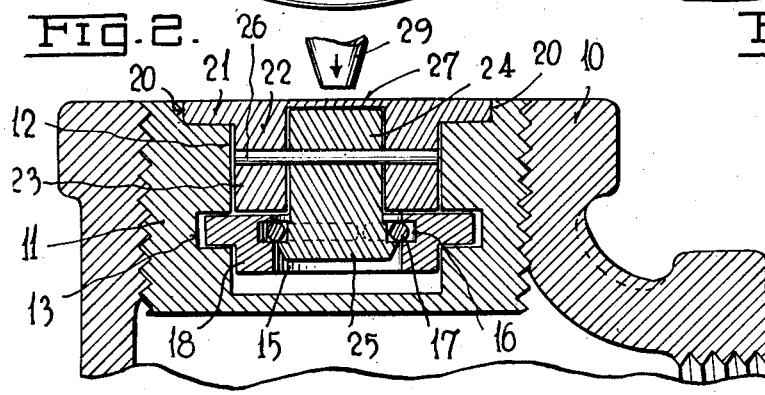
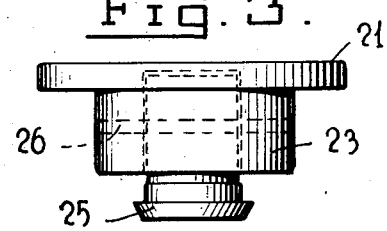
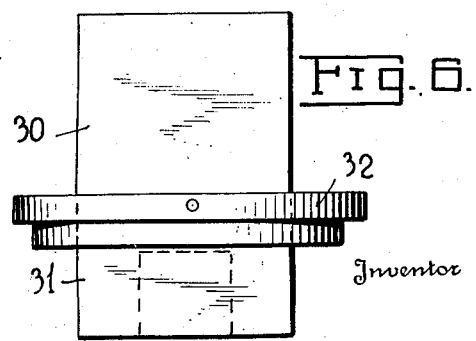
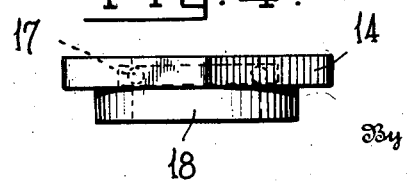
Inventor
Arthur Lewis,
By Karl Fenning
his Attorney Patented June 1, 1937

2,082,068

UNITED STATES PATENT OFFICE 2,082,068

THEFTPROOF PLUG

Arthur Lewis, Southampton, N. Y.

Application October 6, 1936, Serial No. 104,259

8 Claims. (Cl. 220—39)

The invention relates particularly to plugs or closing means for pipes which may be installed easily and simply but which may be removed only by destroying a portion of the apparatus and by means of a key.

In the accompanying drawing Figure 1 is a plan view of a plug installed in a pipe or coupling a portion being broken away. Fig. 2 is a transverse vertical section on the line 2—2 of Fig. 1. Figs. 3, 4 and 5 are detail views and Fig. 6 is a side elevation of a key for manipulating the plug.

Into the usual threaded side 10 of the coupling on a pipe may be inserted the plug 11 proper which consists of a cylindrical threaded device having its inner end closed and provided on its outer side with a centrally disposed rectangular opening 12 through most of the depth of the plug. Towards the bottom of the opening 12 is provided a circumferentially extending circular border 13 cooperating to form a seat for the sealing member of the plug. A washer 14 is provided preferably square in cross-section and corresponding substantially to the opening 12. The member 14 has a centrally disposed circular hole 15 extending end to end and the circular hole 15 is expanded at 16 into a larger circular opening. An elastic ring 17 preferably of spring metal may be compressed and seated in the channel 16. The square washer 14 has a circular extension 18 the diameter of which is somewhat less than the cross-section of the square hole 12. With the split ring 17 in place in the washer 14 the washer is inserted into the square hole 12 until its square portion comes opposite the enlarged channel 13. In this position the washer may be turned so that its corners enter the channel 13 as indicated in Figs. 1 and 2 the extension 18 extending therebelow. In this position a triangular spline or key 19 may be inserted between one flat side of the washer 15 and a corner of the opening 12 thus locking the washer 15 against turning. At its upper end the opening 12 is provided with an enlarged circular seat 20 for the head 21 of the sealing plug 22. The sealing plug 22 has a circular extension 23 adapted to receive the shank of a locking bolt 24 which has at its lower end an enlarged head 25 preferably having upwardly flaring side walls. A pin 26 of relatively fragile material locks the bolt 24 into the closing plug 22. The center portion 27 of the upper portion of the plug 22 is preferably made very thin and on the surface a mark 28 of some sort is preferably placed at about the center of the head 21 of the sealing plug 22. With the bolt 24 locked into the plug 22 the assembled device is placed in the opening 12 and the head 25 is forced against the coil 17 causing it to expand and allow the head to pass therethrough in which position it may not be extracted. When the head 25 passes the spring 17 it brings the enlarged portion 21 of the sealing plug 22 into and squarely against the seat 20 in the plug 11. When the apparatus is thus properly installed there is substantially a smooth flat surface made by the face of the coupling 10 the end of the plug 11 and the surface of the head 21. Preferably the diameter of the head 21 is substantially the diameter of the seat 20 so that it is impossible to insert a tool sufficiently to force the plug apart. In this condition the plug 11 is in place and it may not be removed because the square central opening 12 which receives the manipulating key is closed. In order to remove the plug a punch 29 is applied at the center 28 and the thin closing portion 27 is punctured. The punch 29 then reaches the upper end of the stem of 24 and breaks the fragile key 26. This allows the plug 23 to be removed and the plug 11 then may be unscrewed and removed. For this purpose there may be provided a key or wrench 30 such as illustrated in Fig. 6 which may be square in cross-section corresponding to the square opening 12 and may have in one end an opening 31 to encircle the stem 24. Surrounding the stem 24 the key may be provided with a collar 32 to rest in the seat 20. The key 30 may be used to initially install the plug 11 in place.

Further, the seal cap or plug 22 is not held stationary in its place. It rotates and can be manipulated around in either direction. Thus it baffles a prospective tamperer and the method of removing the seal is made less apparent. The fact that it is to be done by punching the center of the seal does not occur to a stranger to the device so readily as it might if he sees a cumbersome exterior cap which obviously can be removed in no way other than by breaking. This is particularly true since nothing on the seal indicates to the uninitiated the place or manner of breaking. Further, the fact that the seal revolves and is set in the face of the plug in such a way as to be inaccessible renders it impossible for a thief to get a hold of it in any way. Under the present arrangement, the revolving seal presents the impossibility of gaining any purchase on the removable portion of the plug. If it is struck or tapped at the outer edge of the seal, its rotation helps to prevent gaining an entry at the crack which would be easier were the whole thing rigid. Possibly if the seal did not revolve it might be impossible to use a means of fastening it to the plug of such a fragile nature that it can be disconnected by a tap of a punch and yet be strong enough to hold the seal in place in a practical manner.

It will thus be seen that when the plug is in place and closed it can be removed only by destroying part of the apparatus. Thus it cannot be surreptitiously tampered with. It cannot be opened even with a key without first destroying a part of the apparatus. Thus the present invention may be referred to as a seal device rather than a lock plug. Because the portion of the device destroyed is small and because the rest of the device can be used repeatedly by merely supplying another seal cap the plug provides efficiency combined with economy.

The plug readily lends itself for use in connection with pipes of various sorts which it is desired should not be tampered with by unauthorized persons. It is especially adapted to gas pipes, water pipes, oil pipes and other systems which might otherwise be tapped and the contents surreptitiously withdrawn. It may also be used in sealing drums or other containers which for some reason must be securely and safely sealed against tampering.

The details of construction illustrated are not essential to the present invention which may be embodied in other structures.

I claim as my invention:

1. A plug comprising a threaded member provided with a central aperture and a closed end, a washer adapted to be seated in the aperture, a key for locking the washer in the aperture, a spring in a seat in the washer, a shaft having an enlarged head adapted to be forced through the spring and retained thereby, a hollow stem adapted to receive the shaft and be locked thereto by a fragile key, a cover on the stem, and a seat in the plug to receive the cover and close the aperture.

2. A plug comprising a threaded member provided with a closed end and a rectilinear central aperture having an enlarged circular portion, a rectilinear washer adapted to enter the aperture and to be turned to enter the enlarged portion, a key for locking the washer in the enlarged portion, a spring in a seat in the washer, a shaft having an enlarged head adapted to be forced through the spring and retained thereby, a hollow stem adapted to receive the shaft and be locked thereto by a fragile key, a cover on the stem having a weakened portion which is adapted to be broken to allow the stem to be moved to break the fragile key to release the hollow stem, and a seat in the plug to receive the cover and close the aperture.

3. A plug comprising a threaded member provided with a central aperture, a washer removably retained in the aperture, a shaft having a head adapted to be forced into the washer and retained thereby, a hollow stem to receive the shaft and be locked thereto by a fragile key, and a cover on the stem closing the aperture.

4. A plug comprising a threaded member provided with a central aperture and a closed end, a washer seated in the aperture, a key for locking the washer in the aperture, a spring in a seat in the washer, a shaft having a head adapted to be forced through the spring and retained thereby, a hollow stem to receive the shaft and be locked thereto by a fragile key, a cover on the stem, and a seat in the plug to receive the cover and close the aperture, said central aperture adapted to receive an opening key adapted to rest in the seat and surround the shaft and engage the aperture.

5. In a plug a threaded member provided with an aperture, a washer held in the aperture, a spring in a seat in the washer, a shaft retained by the washer, a hollow stem to receive the shaft and be locked thereto by a fragile key, and a cover on the stem closing the aperture.

6. In a plug a threaded member provided with an aperture, a washer held in the aperture, a shaft retained by the washer, a hollow stem adapted to receive the shaft, frangible connecting means between the shaft and the stem, and a cover on the stem closing the aperture.

7. In a plug a threaded member provided with an aperture, a washer held in the aperture, a shaft having a head retained by the washer, a cover closing the aperture and frangible connection means between the cover and the shaft.

8. A plug comprising a threaded member provided with an aperture, a washer held in the aperture, a spring in a seat in the washer, a shaft retained by the spring, a hollow stem adapted to receive the shaft, a cover on the stem closing the aperture, and frangible means connecting the stem and the shaft.

ARTHUR LEWIS.